(12) United States Patent
Chang et al.

(10) Patent No.: US 7,325,745 B2
(45) Date of Patent: Feb. 5, 2008

(54) CARD READER ASSEMBLY

(75) Inventors: Chi-Tung Chang, Taipei (TW); Ant Lan, Taipei County (TW); Ricky Kao, Taipei (TW)

(73) Assignee: Alcor Micro, Corp., Taipei (TW)

( * ) Notice: Subject to any disclaimer, the term of this patent is extended or adjusted under 35 U.S.C. 154(b) by 424 days.

(21) Appl. No.: 11/113,433

(22) Filed: Apr. 25, 2005

(65) Prior Publication Data

US 2006/0237539 A1    Oct. 26, 2006

(51) Int. Cl.
*G06K 7/00*    (2006.01)

(52) U.S. Cl. ................ 235/486; 235/441; 235/380

(58) Field of Classification Search ............ 235/487, 235/441, 475, 479, 482, 483, 486, 380, 375, 235/382

See application file for complete search history.

(56) References Cited

U.S. PATENT DOCUMENTS

2005/0284200 A1* 12/2005 Moon et al. ............... 70/278.2

* cited by examiner

Primary Examiner—Karl D. Frech (57) ABSTRACT

The present invention discloses an improved card reader assembly, and more particularly an improved adapter assembly of a card reader that stacks the components in the space as to achieve the effect of saving the area and volume of the adapter of the card reader. The improved card reader assembly is an improved adapter assembly that includes a card base, and the card base includes a circuit board and at least one slot. The circuit board has a plurality of lead terminals electrically coupled to a memory card that is inserted into the slot; a top cover; and a chip and an oscillating crystal are installed in the adapter body at a position between the top cover and the card base. The chip is situated between the lead terminal of the card base and the slot, and the chip and the oscillating crystal are electrically connected to the circuit board, and a terminal set is installed onto the adapter body and electrically connected to the circuit board and the chip. Further, the chip is installed inside the structure and electrically connected to the circuit board. The present invention can reduce the area and volume of a card reader as well as the number of pins on the adapter to facilitate maintenance and repairs and improve the economic benefits of manufacturing card readers and the stability of signal transmissions.

11 Claims, 11 Drawing Sheets

CARD READER ASSEMBLY

FIELD OF THE INVENTION

The present invention relates to an improved card reader assembly, and more particularly to an improved connector assembly of a card reader that stacks all components in the space of the card reader to achieving the effect of saving the area and volume of the connector of the card reader.

BACKGROUND OF THE INVENTION

As a memory card (or storage card) for storing data, such as a PCMCIA ATA Flash Card (PC card), a Compact Flash Card (CF card), a Smart Media Card (SM card), a Multi-Media Card (MMC card), a Memory Stick Card (MS card), a Secure Digital Card (SD card), a Micro Driver card, a chip card, and an XD, etc has the high-capacity, rewritable, vibration-resisting, light, thin, short and compact features, the memory card is thus used extensively for the data storage of computers and digital electronic devices such as a notebook computer, a personal digital assistant (PDA), a digital camera (DSC), and a MP3 players, etc, and these types of memory cards are accessed through a card reader. The card reader is generally comprised of a card adapter and a circuit board. At present, the card adapter is developed with a universal design for adapting various different memory cards. Please refer to FIG. 1 for a perspective view of a prior art.

Figure 1:
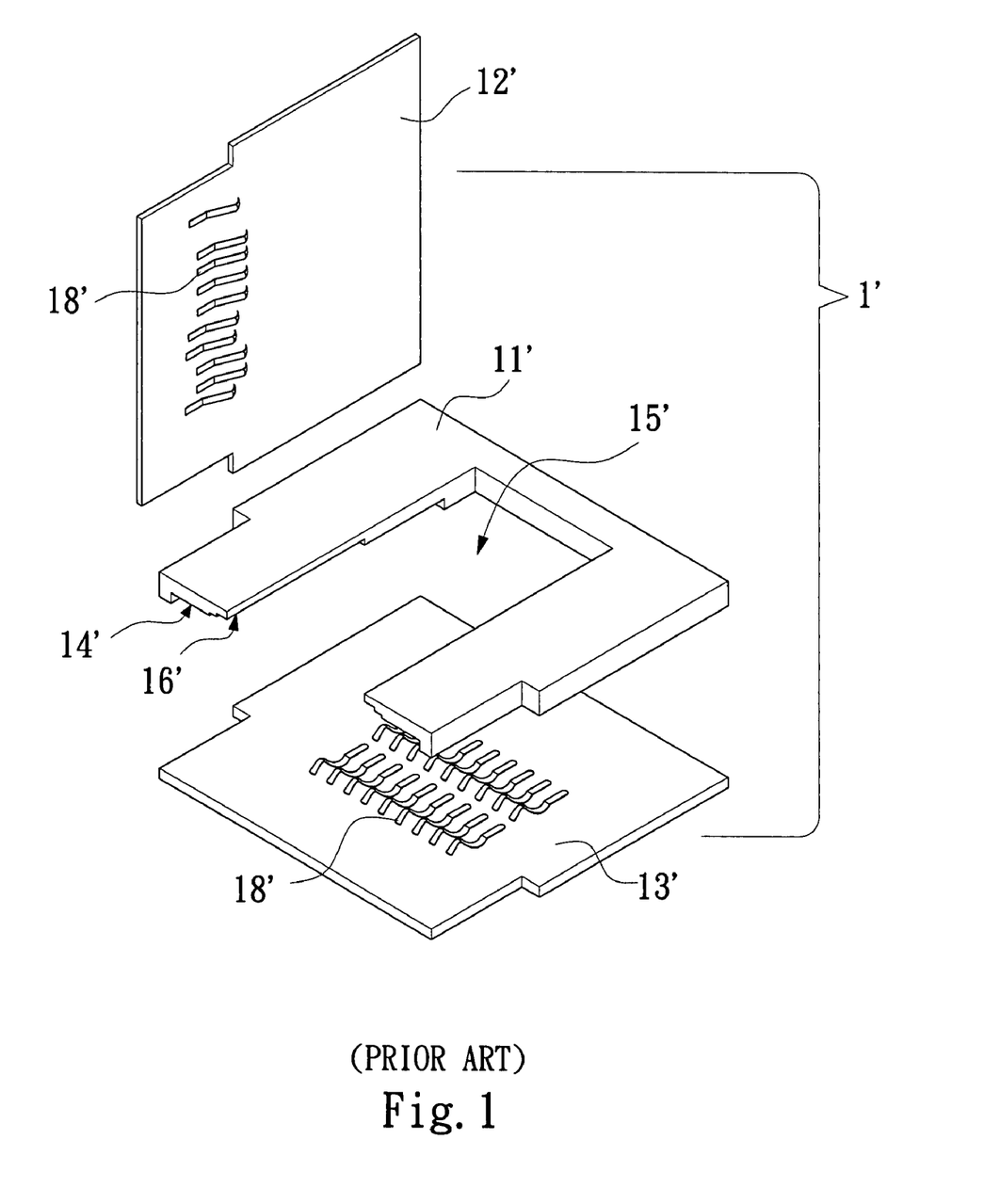
FIG. 1 is a perspective view of a prior art.

In FIG. 1, a traditional memory card adapter comprises a base 1' consisting of a plank base 11', an upper panel 12' and a lower panel 13', and both upper and lower panels 12', 13' are installed on the plank base 11' having a plurality of contact members 18' electrically connected to a memory card of various different types, when such memory card is inserted.

Figure 1A:
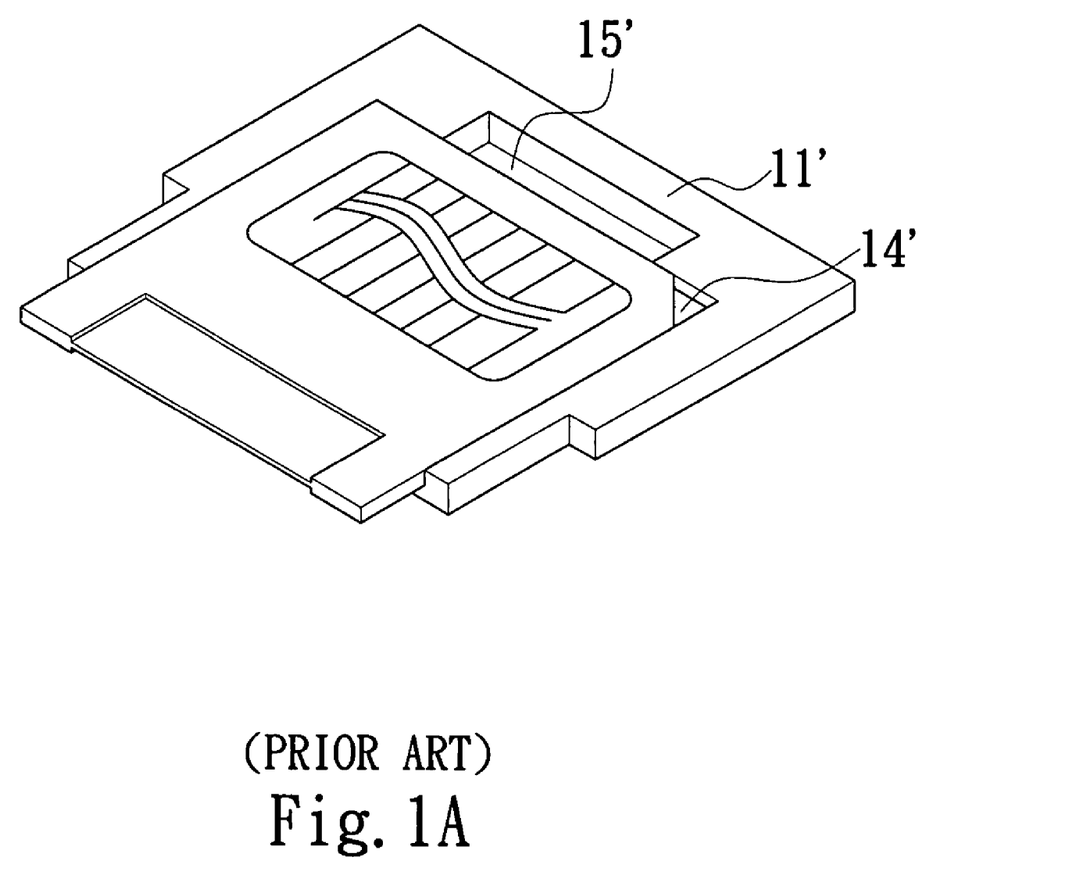
FIG. 1A is a perspective view of an embodiment of a prior art.
Figure 1B:
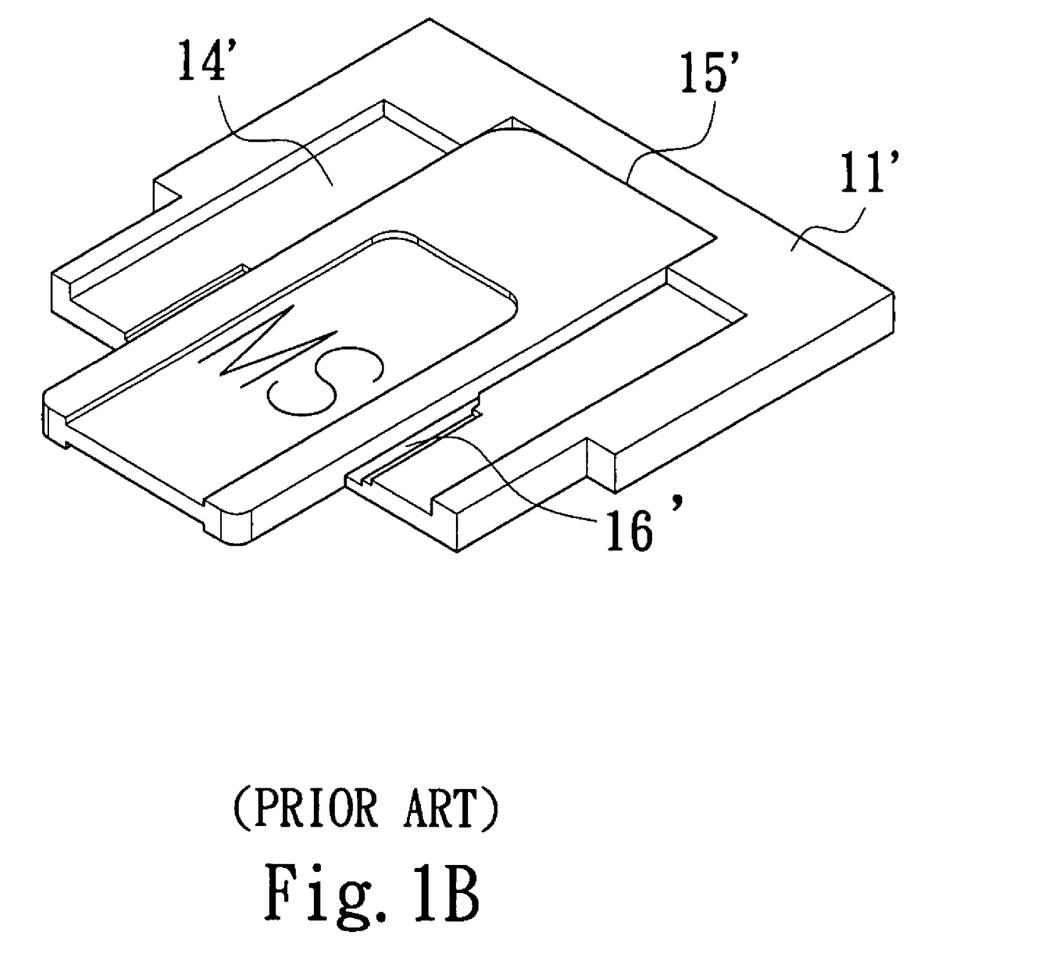
FIG. 1B is another perspective view of an embodiment of a prior art.
Figure 1C:
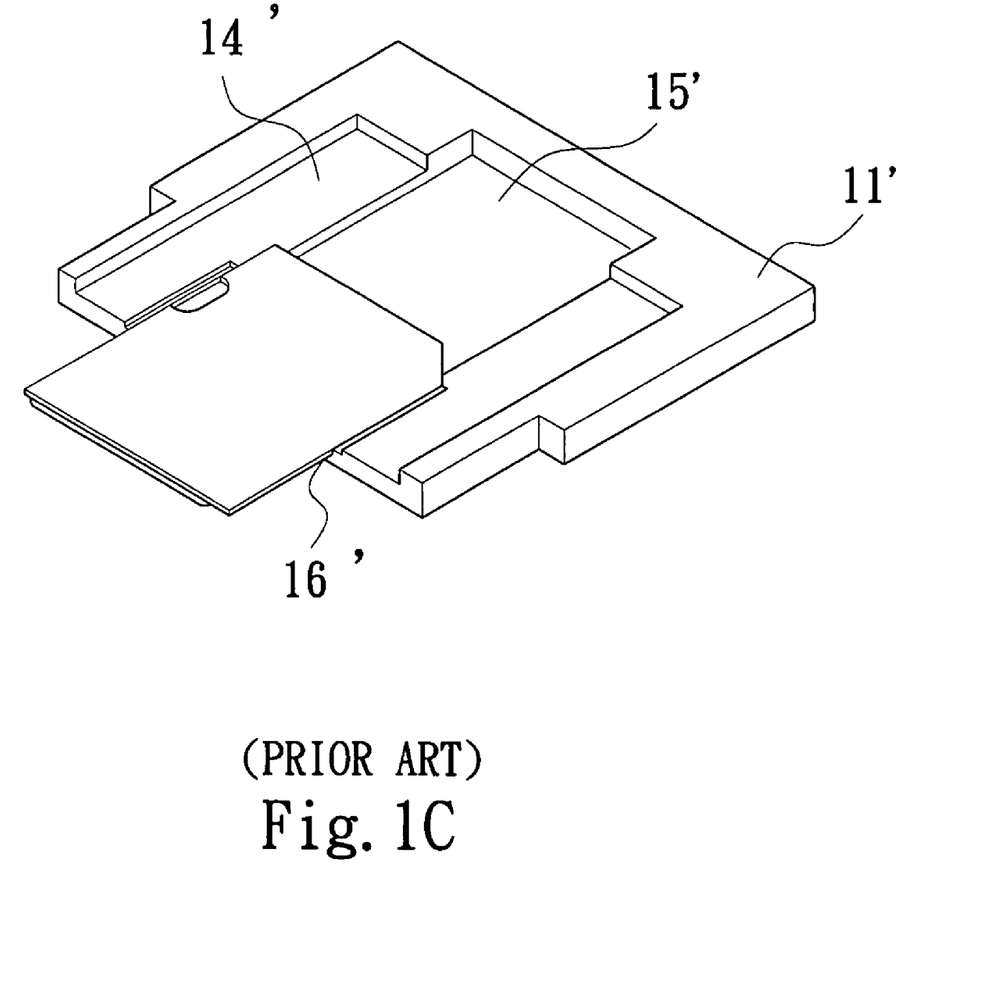
FIG. 1C is another further perspective view of an embodiment of a prior art.

One side of the plank base 11' is an open insert end for receiving the insertion of a memory card, and the space inside the insert end is used for stacking the memory cards so as to reduce the space occupied by the slots and form a plurality of card slots 14', 15' 16' for accommodating a plurality of memory cards of different models and sizes such as a SM card as shown in FIG. 1A, a MS card as shown in FIG. 1B and a SD card as shown in FIG. 1C respectively.

Figure 2:
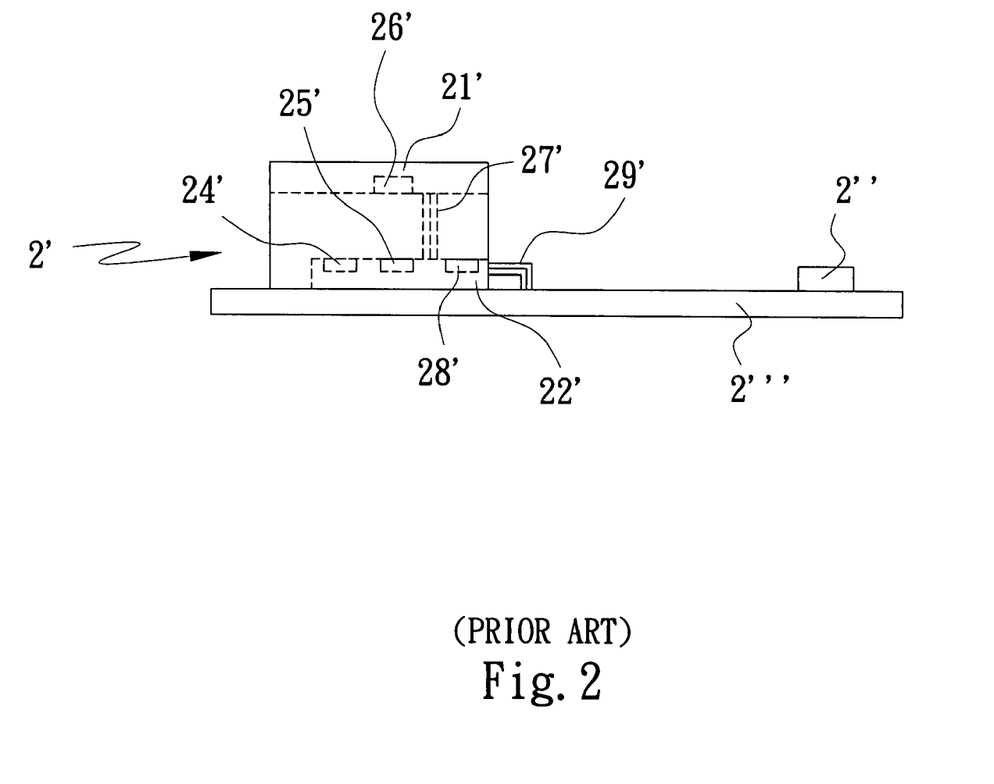
FIG. 2 is a side view of the prior art.

Please refer to FIG. 2 for a schematic side view of a prior art. In FIG. 2, a structure of an adapter 2" is used for receiving and fixing several storage cards of different specifications which are not inserted at the same time. The structure has an upper casing 21' and a first PCB 22' disposed at a corresponding position, and the upper casing 21' and the first PCB 22' include a metal contact lead terminal 27' for contacting different models of memory cards and reading data from the memory card. The metal contact lead terminal 27' of the top cover 21' must be connected to the first PCB 22' such that the metal contact lead terminal 27' of the top cover 21' is coupled to the first PCB 22'. Further, a SMC card lead terminal 26' of the top cover 21' and a lead terminal (not shown in the figure) on the first PCB 22' must be connected to an external second PCB 2''' by a plurality of lead terminals (usually are the 50-pin lead terminals 29') protruded from the rear end of the adapter 2' so as to connect to the signals of the memory card read by the lead terminals of the top cover 21' and the first PCB 22', and the lead terminals of the SM card, MS card and SD card should be connected to an external second PCB 2 at the rear of the adapter 2' of a chip device 2" through a plurality of lead terminals protruded from the rear end of the adapter 2' on the second PCB2. The length or the volume of a card reader is the sum of the lengths or volumes of the adapter and the external chip device and circuit. However, the mechanical design of the foregoing lead terminal not only increases the size of the card reader and adds a circuit board (which is a printed circuit board), but also elongates the signal line between the chip device and the lead terminals. As a result, the quality of the signal transmitted from the lead terminal of the circuit board will be lowered, and it is a pity for not properly maximizing the utility of the space within the adapter. The prior art is not only very complicated and requires adding a plurality of lead terminals (generally 50-pin terminals), but also increases the manufacturing cost.

The foregoing plurality of lead terminals is soldered onto the circuit board (PCB) for transmitting signals. Since there are many lead terminals used for the transmission, therefore the signal transmission becomes unstable and the failure rate rises. In other words, if one of the lead terminals is not soldered securely or the transmission is poor, then it will create a quality problem of the transmission to the adapter of the card reader, and such arrangement is definitely not an ideal design for signal transmissions. Further, the memory card slot in the adapter of a prior-art card reader is connected to a plurality of lead terminals (generally 50-pin terminals) by signal lines, such that the memory card slot can be electrically coupled to a circuit board (PCB) of the base. However, the installation of too many lead terminals relatively increases the manufacturing cost of the card reader, which is not cost-effective for product manufacturing. Therefore, the signal transmission of a prior-art card reader also requires further improvements.

SUMMARY OF THE INVENTION

Therefore, it is a primary objective of the present invention to provide an improved card reader assembly, which installs a chip in an adapter to reduce the size of the card reader and the number of lead terminals of the adapter, and also shortens the length of the signal line.

To achieve the foregoing objective, the technical measure taken by the improved card reader assembly in accordance with the present invention includes an improved adapter. The adapter comprises: a card base having a circuit board and at least one slot, and the circuit board having a plurality of lead terminals disposed thereon, and the lead terminals being electrically coupled to a memory card that is inserted into the slot; a top cover; a chip and an oscillating crystal being installed in the adapter at a position between the top cover and the card base, and the chip being disposed between the lead terminal and the slot of the card base, and the chip and oscillating crystal being electrically coupled with the circuit board; and a terminal set disposed on the adapter and electrically coupled with the circuit board and the chip.

To make it easier for our examiner to understand the characteristics, technical measures, accomplished functions, and objective of the invention, we use a preferred embodiment together with the attached drawings and numerals for the detailed description of the invention.

DETAILED DESCRIPTION OF THE PREFERRED EMBODIMENTS

Figure 3:
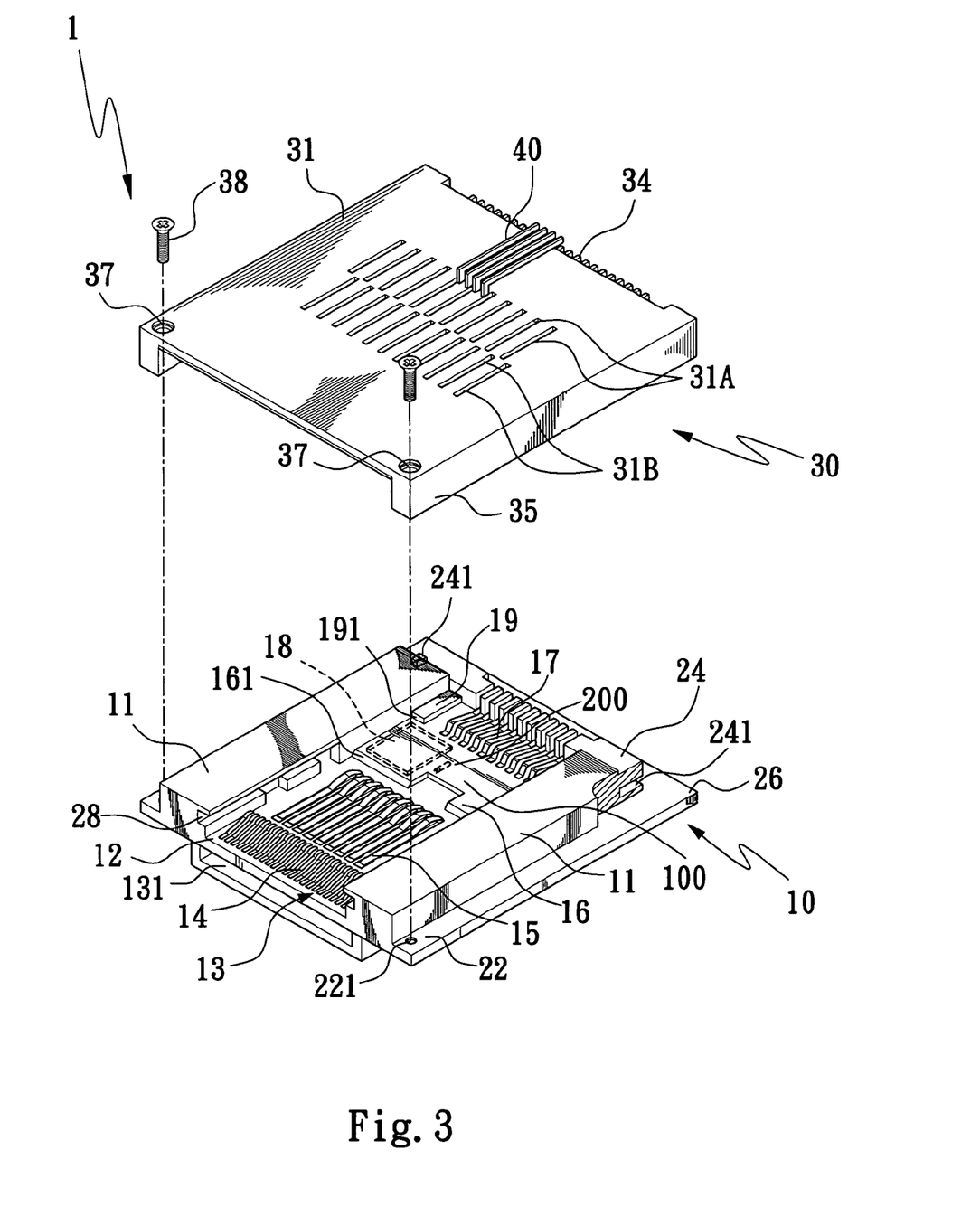
FIG. 3 is an exploded view of a first preferred embodiment of the present invention.
Figure 4:
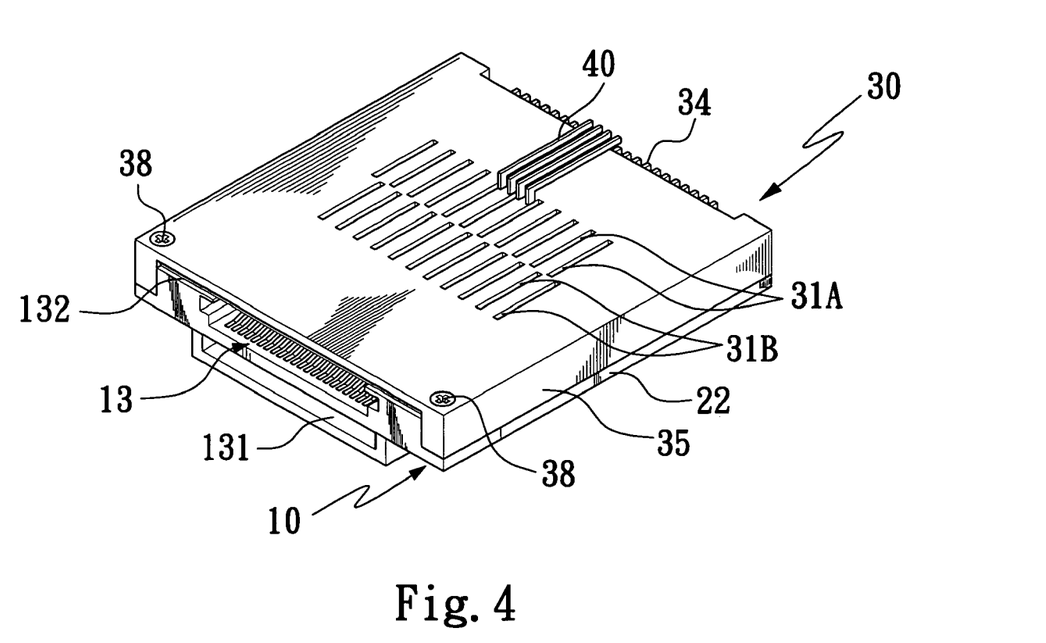
FIG. 4 is a front view of a first preferred embodiment of the present invention.
Figure 5:
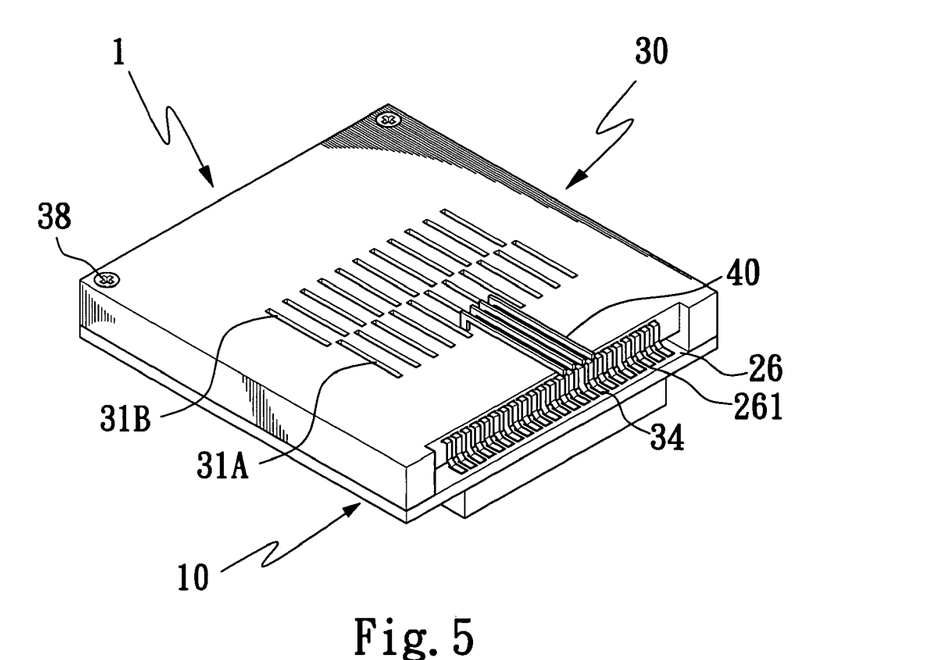
FIG. 5 is a rear view of a first preferred embodiment of the present invention.

Please refer to FIGS. 3, 4 and 5 for an exploded view, a front view and a rear view of a first preferred embodiment of the present invention respectively. The improved card reader assembly of the present invention includes an adapter 1, and the adapter 1 includes a card base 10 and a top cover 30; the card base 10 includes a side base 11 on both sides and a circuit board 12 at the middle, and an insert slot 13 is disposed between the side base and the circuit board 12. A side board 22 and an end base 24 are extended from the external side and the rear end of the side base 11 respectively. A positioning screw hole 221 is disposed at a front end of the side board 22, and a positioning slot 241 is disposed at a lateral side of the end base 24. Further, a notch is disposed on the internal side of the side base 11 to define a card insert opening with different widths for the insert slot 13; a plurality of lead terminals 14, 15 arranged in a row is disposed at the front end of the circuit board 12; a rear circuit board 16 is electrically connected to a rear end of the circuit board 12, and a connecting board 26 is extended from the rear end, and there is a height difference between the rear circuit board 16 and the circuit board 12 to define a press end 161. The rear circuit board 16 includes a chip 18 disposed thereon and a plurality of lead terminals 17 disposed at the rear end. Further, the rear circuit board 16 has a press board 19 disposed on both lateral sides of the rear, and there is a height difference between the press board 19 and the rear circuit board 16 to define a press end 191, and the press end 161, 191 are provided for pressing the ends when different memory cards are inserted. The connecting board 26 includes a row of plurality of terminal connecting boards 261. The insert slot 13 further comprises an insert slot 131 disposed under the circuit board 12, and the insert slot 131 is provided for the insertion of a CF card or another memory card.

Figure 6:
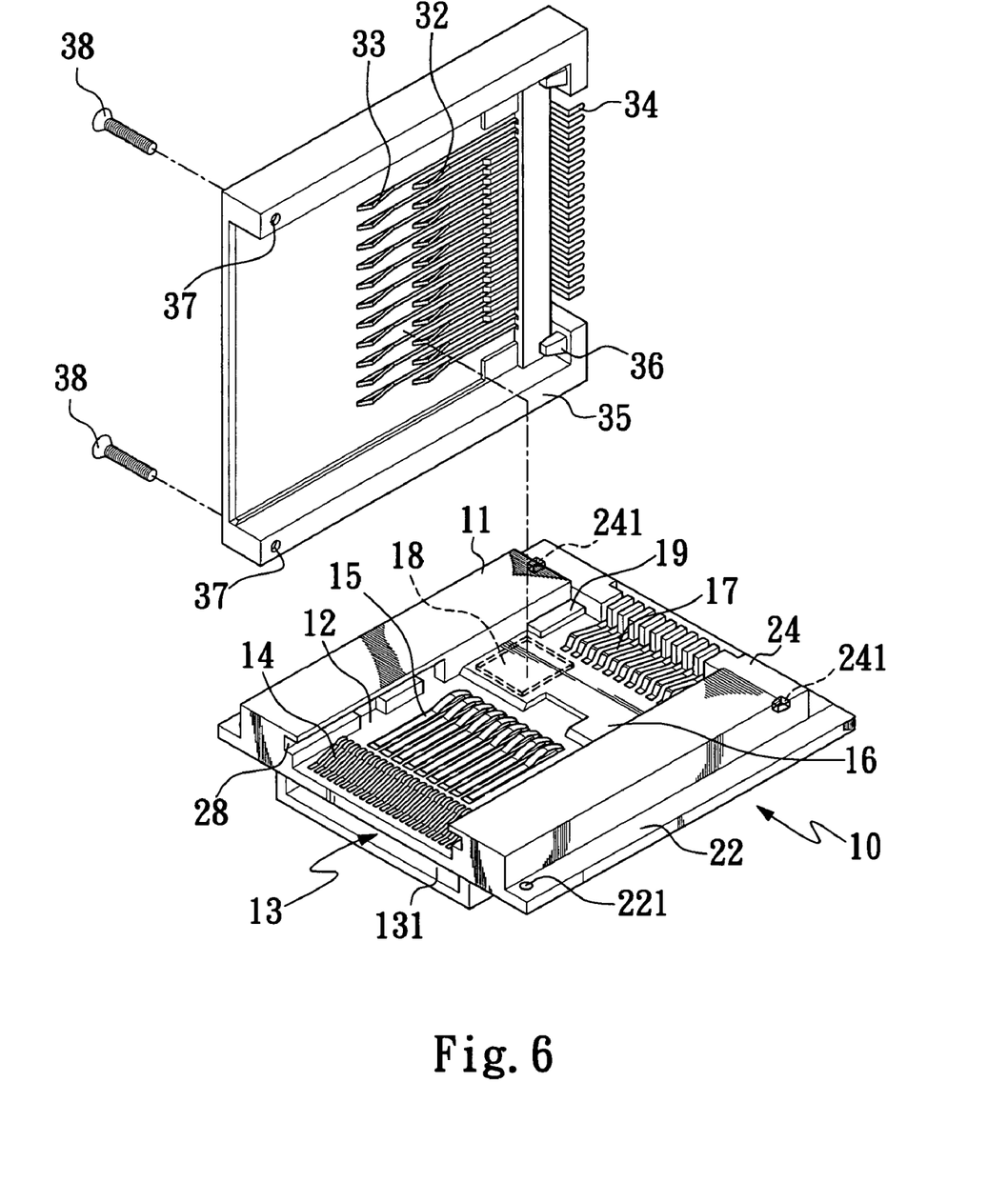
FIG. 6 is another exploded view of a first preferred embodiment of the present invention.

Please refer to FIG. 6 for an exploded view of another preferred embodiment of the present invention. The top cover 30 is substantially a n-shaped cover, which includes a top panel 31 and two side panels 35, and the top panel 31 includes a row of small through grooves 31A, 31B, and the top panel 31 has a row of terminal leads 32, 33 disposed on the internal side of the top panel 31 at a position corresponding to the small through grooves 31A, 31B as shown in FIG. 6. The lead terminal 32, 33 forms a L-shaped row of lead terminals 34 disposed on a rear end of the lead terminal 32, 33 and protruded from the top cover 30. The side panel 35 has a positioning insert member 36 disposed on an internal side at the rear end of the side panel 35 for as shown in FIG. 6 for coupling the positioning slot 241 of the card base 10, and the side panel 35 has a positioning hole (or positioning screw hole) 37 disposed on the top panel 31 above a front end of the side panel 35. Further, the top panel 31 includes a USB terminal set 40 disposed at an appropriate position on a rear end of the top panel 31 and the USB terminal set 40 is electrically coupled to the chip 18.

Figure 6A:
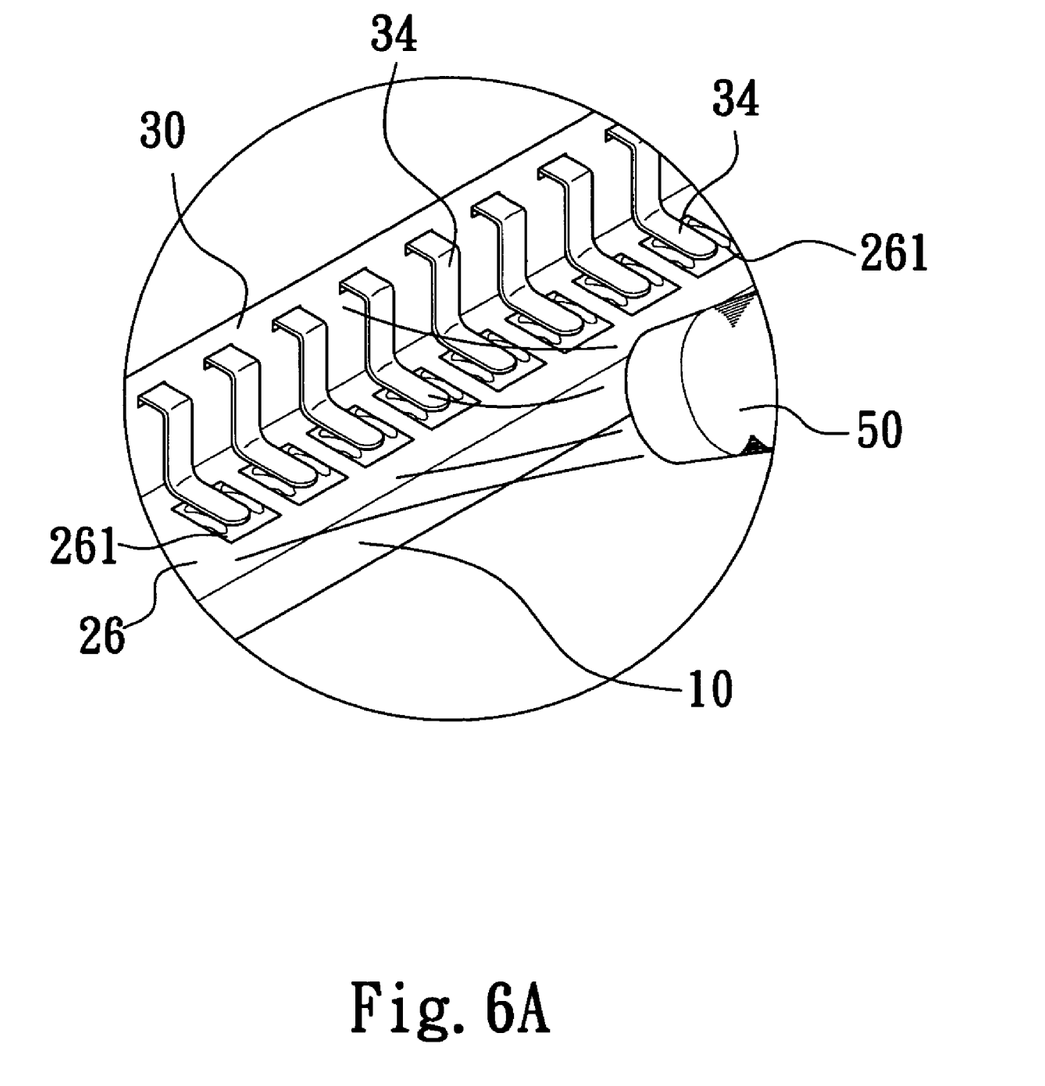
FIG. 6A is a detailed view of part of FIG. 6.

When the adapter 1 of the present invention is assembled, the positioning insert member 36 (as shown in FIG. 6) of the top cover 30 is inserted into the positioning slot 241 of the card base 10 first, and then the side panel 35 of the top cover 30 covers the side board 22 of the card base 10, and a screw 38 (as shown in FIG. 6) passes through the positioning hole 37 of the top cover 30 to be secured with the positioning screw hole 221 of the card base 10, and finally the lead terminals 34 at the rear end of the top cover 30 are soldered to the terminal connecting board 261 (as shown in FIG. 6A) at the rear end of the card base 10 by a surface mount technology (SMT) so as to complete the assembling of the adapter 1. Since an insert slot 132 of the slot 13 is defined between the top panel 31 of the top cover 30 and the top surface of the side base 11 of the card base 10, the insert slot 132 is provided for the insertion of a corresponding memory card. Thus, the insert slots 13 (including the insert slot 131 and the insert slot 132) can provide the aforementioned universal insertion of different memory cards.

Further, the chip 18 proximate to the lead terminals 17, 34 (as shown in FIGS. 3 and 4) is disposed on the circuit board 12. When a memory card is inserted into the insert slot 13, a card insertion space 100 refers to an area that covers the card in the card reader. The chip 18 or its related oscillating crystal 200 (such as a crystal or a resolator) is situated in the remained space of the card insertion space 100 to maximize the utility of the remained space of the adapter 1. As to the circuit layout, if the chip 18 is proximate to the lead terminals 17, 34, then the length of the signal line between the lead terminals 17, 34 and the utility of the chip 18 can be maximized to improve the quality of signal transmissions. In other words, the lead terminal 34 of the top cover 30 is soldered to the circuit board 12. The wiring of the circuit board 12 is coupled to the chip 18. As to the overall size, the chip 18 in the design of a general card reader is usually installed at the rear side of the adapter. If the chip 18 or its connected oscillating crystal 200 is installed between the lead terminals 17, 34 and the memory card insert slot 13, which is under the top cover 30 of the adapter. In other words, the chip 18 can be situated above or under the circuit board 12, and thus the invention can shorten the length from the insert slot 13 to the rear end. Since the length from the slot 13 to the rear end is limited by the position of the lead terminal 17, 34, therefore the position of the chip 18 or its connected oscillating crystal 200 is situated between the lead terminal 17, 34 and the slot 13, and the remained space under the top cover 30 is utilized properly so as to shorten the length from the insert slot 13 to the rear end. In the preferred embodiment, even though the chip 18 is situated between the lead terminals 14, 15, 17, 34, the wire layout of the lead terminals 14, 15, 17, 34 of the circuit board 12 can be connected to the chip 18 in a short distance easily. Since the size of the card reader is limited by its structure to restrict the position and the insert depth of the card, therefore the position of the chip 18 or its connected oscillating crystal 200 will wholly or partially occupy the area (such as over 40% of the area of the chip 18 and its connected oscillating crystal 200), and the insert cards are stacked in the space (for example, the SMC cards are inserted with the largest depth). Thus, the present invention can achieve the effect of reducing the area and volume of the card reader.

Figure 7:
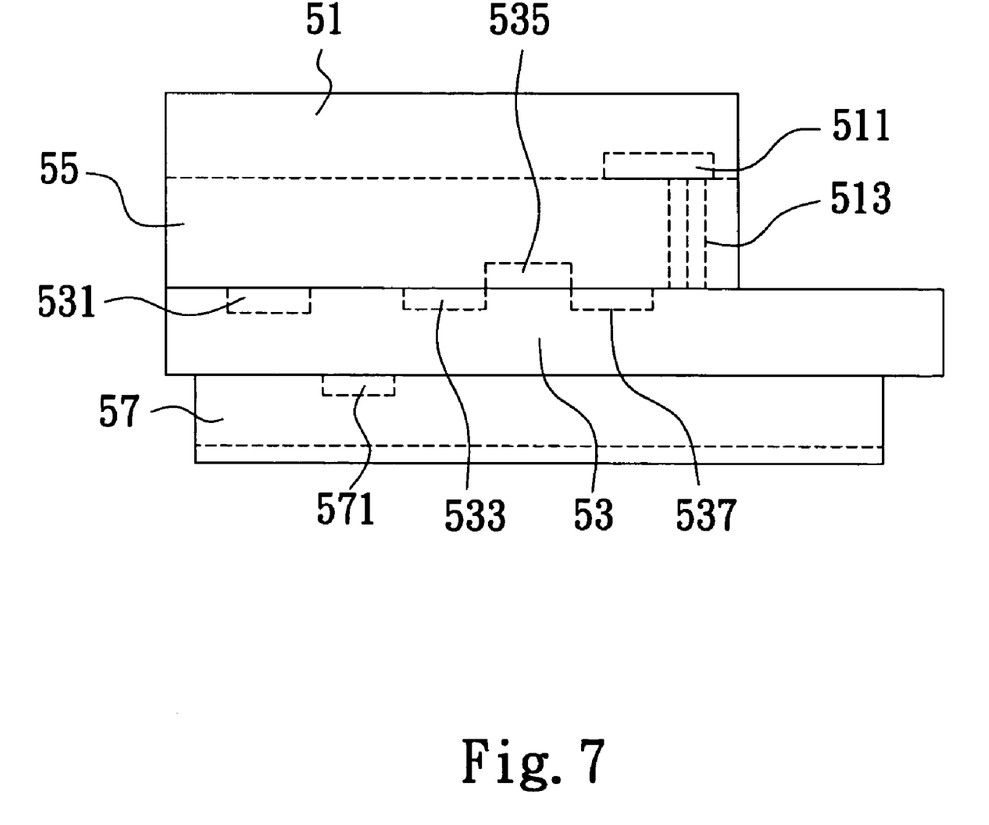
FIG. 7 is a schematic side view of a second preferred embodiment of the present invention.

Please refer to FIG. 7 for a side view of a second preferred embodiment of the present invention. An adapter 5 only uses one circuit board 53 to be extended into a 3-deck adapter structure. In FIG. 7, the top cover 51 comprises a SMC card lead terminal 511 that includes a lead terminal 513 coupled to the circuit board 53. A XD/SD/MS card terminal 531, 533, 537 is installed on the surface of the circuit board 53 facing the slot 55, and a CF card lead terminal 571 is disposed in an insert slot 57 under the circuit board 53. The chip 535 can be installed onto the circuit board 53. In the foregoing second preferred embodiment, the chip 535 is disposed between the lead terminal 513 and the memory card insert slot 55, or the chip 535 can be installed under the circuit board 53 and at the rear side of the CF card lead terminal 571 (such layout is not shown in the figure). Therefore, the wire layout of the lead terminals 511, 531, 533, 537, 571 of the SMC/XD/SD/MS/CF cards can be connected to the chip 535 in a short distance so as to achieve the effect of reducing the area and volume of the card reader.

In the foregoing structure, if the card reader fails, a screw 38 can be removed, and a solder blower 50 can melt and separate the lead terminal 34 of the top cover 30 from the lead connecting board 261 of the card base 10 (as shown in FIG. 6A) and further separates the top cover 30 and the card base 10 so as to test, maintain, repair or replace the components inside the card reader. The failed card reader can be used again after the repair is completed, and thus the present invention can fully overcome the shortcoming of a prior-art card reader that is discarded when the card reader fails. On the other hand, the chip 18, circuit board 12 and related components cannot be heated or soldered during the production process due to the existence of the top cover 30. Therefore, the top cover 30 is not installed first, but will be installed after the components on the card base 10 are installed and the chip 18, circuit board 12 and related components are tested.

Further, if the card reader is installed, the USB terminal set 40 of the adapter 1 is connected to a USB connecting base (not shown in the figure) to complete the signal transmission or the adapter 1 uses an IDE interface adapter for the signal transmission.

Figure 8:
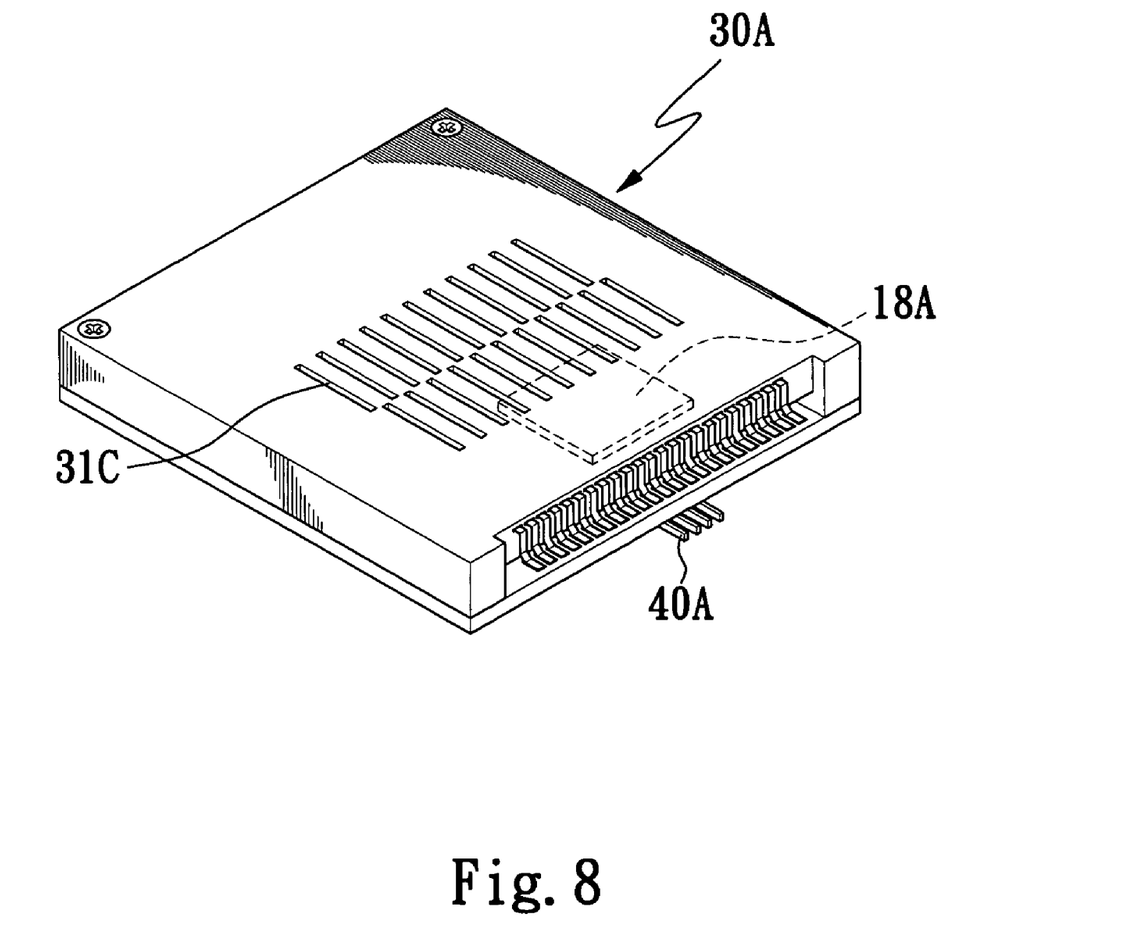
FIG. 8 is a perspective view of a third preferred embodiment of the present invention.

Please refer to FIG. 8 for a perspective view of a third preferred embodiment of the present invention. In FIG. 8, the chip 1 8A is installed at an appropriate position on an internal side of the top panel 31C of the top cover 30A, and the chip 18A is electrically connected to the USB terminal set 40A. Similarly, the spatial stacking layout for the cards can achieve the effect of shortening the wire layout.

In view of the description above, the present invention connects the terminals at the top cover to the chip by the signal line, and also connects the terminals at the card base to the chip by the signal line. The four pins of the chip are connected to the USB terminal set, which is unlike the prior-art adapter that needs to connect the lead terminal (50-pin terminal) externally to a specified circuit board.

Since the chip of the present invention is situated inside the card reader, therefore the invention not only can lower the manufacturing cost, but also can reduce the length of the card reader, so as to greatly reduce the area and volume of the card reader. The chip according to the present invention is installed inside the card reader, and thus the invention provides an easily detachable structure to facilitate the maintenance and repair of the card reader. The chip of the card reader will not be discarded if there is only a slight error or malfunction. In addition, the structure of the present invention enhances the stability and speed of the signal transmission, and further provides a better signal transmission to the card reader as well as the manufacturing benefits.

Since the structures of the card base and the top cover according to the present invention can be detached easily, the card base and its related components can be installed in the manufacturing process and the circuit and chip on the circuit board can be tested first. Finally, the top cover and card base are assembled. The present invention overcomes the shortcoming of a prior-art adapter that cannot be tested easily and thus can effectively improve the yield rate of the manufacturing process.

It is noteworthy that the positions for installing the foregoing chip and USP terminal are used for example only, and the use of the screw for fixing the card base and the top cover is to demonstrate the feasibility of the embodiment of the present invention. The persons skilled in the art can modify the embodiment according to actual needs.

In summation of the description above, the improved card reader assembly according to the present invention bases on its special structural characteristics to assure that the invention can achieve each requirement of the objectives of the invention. Since the structure of the invention can reduce the size of the card reader, therefore the invention can better fit the applications for various portable devices such as a notebook computer and a digital camera, etc. Further, there is no need to add too many pins on the circuit board, and thus greatly reducing the complexity of the structure and effectively lowering the manufacturing cost.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An improved card reader assembly being an improved adapter assembly and comprising:
    a card base, having a circuit board and at least one slot, and said circuit board having a plurality of lead terminals disposed thereon, and said lead terminals being electrically coupled to a memory card that is inserted into said slot;
    a top cover;
    a chip and an oscillating crystal, being installed in said adapter at a position between said top cover and said card base, and said chip being disposed between said lead terminal and said slot of said card base, and said chip and said oscillating crystal being electrically coupled with said circuit board; and
    a terminal set, disposed on said adapter and electrically coupled with said circuit board and said chip.

2. The improved card reader assembly of claim 1, wherein said terminal set adopts a universal serial bus (USB) interface.

3. The improved card reader assembly of claim 1, wherein said terminal set adopts an integrated drive electronics (IDE) interface.

4. The improved card reader assembly of claim 1, wherein said chip and said oscillating crystal are stacked in a space with an area greater than 40% of the area of said memory card being inserted into said slot.

5. The improved card reader assembly of claim 4, wherein said chip is installed in one of the modes selected from the top of said circuit board and the bottom of said circuit board.

6. The improved card reader assembly of claim 1, wherein said top cover and said card base are detachable and installable structures.

7. The improved card reader assembly of claim 1 further comprising a positioning mechanism disposed between said card base and said top cover.

8. The improved card reader assembly of claim 7, wherein said positioning mechanism comprises a positioning slot disposed on a side base of said card base and a corresponding positioning insert member disposed on said top cover.

9. The improved card reader assembly of claim 7, wherein said positioning mechanism comprises a positioning screw hole disposed on said card base and a corresponding positioning hole disposed on said top cover, and said positioning screw hole and said positioning hole are coupled by a screw.

10. The improved card reader assembly of claim 1, wherein said circuit board comprises a plurality of terminal connecting boards disposed at a rear end of said circuit board, and said top cover comprises a plurality of lead terminals protruded from a rear end of said top cover, and said lead terminals are soldered to said plurality of terminal connecting boards of said card base by a surface mount technology.

11. The improved card reader assembly of claim 1 further comprising a plurality of lead terminals disposed on said top cover in a direction corresponding to said slot of said card base, and said lead terminal is coupled to said circuit board.

* * * * *